United States Patent Office 3,478,847
Patented Nov. 18, 1969

3,478,847
DUAL-NETWORK DISK BRAKE
Alfred Bender, Hofheim, Taunus, and Wilhelm Knapp, Bad Homburg, Germany, assignors to Alfred Teves G.m.b.H., Frankfurt am Main, Germany
Filed Dec. 7, 1967, Ser. No. 688,844
Claims priority, application Germany, Jan. 14, 1967, T 32,977; Apr. 28, 1967, T 33,747
Int. Cl. B60t 11/24; F16d 55/228
U.S. Cl. 188—152                                          4 Claims

ABSTRACT OF THE DISCLOSURE

A dual-network disk brake having a yoke and a pair of cylinders formed in the yoke on opposite sides of the brake disk, each of these cylinders being provided with a piston relatively proximal to a respective brakeshoe and a further piston relatively distal therefrom, the master cylinder having respective compartments feeding fluid behind each of the pistons on each side of the yoke. The transmission lines are so arranged that the distal piston of one side of the yoke is connected in parallel with the proximal piston of the other side; means are provided for transmitting force between the distal pistons and the proximal pistons to the brakeshoes.

---

Figure 1:
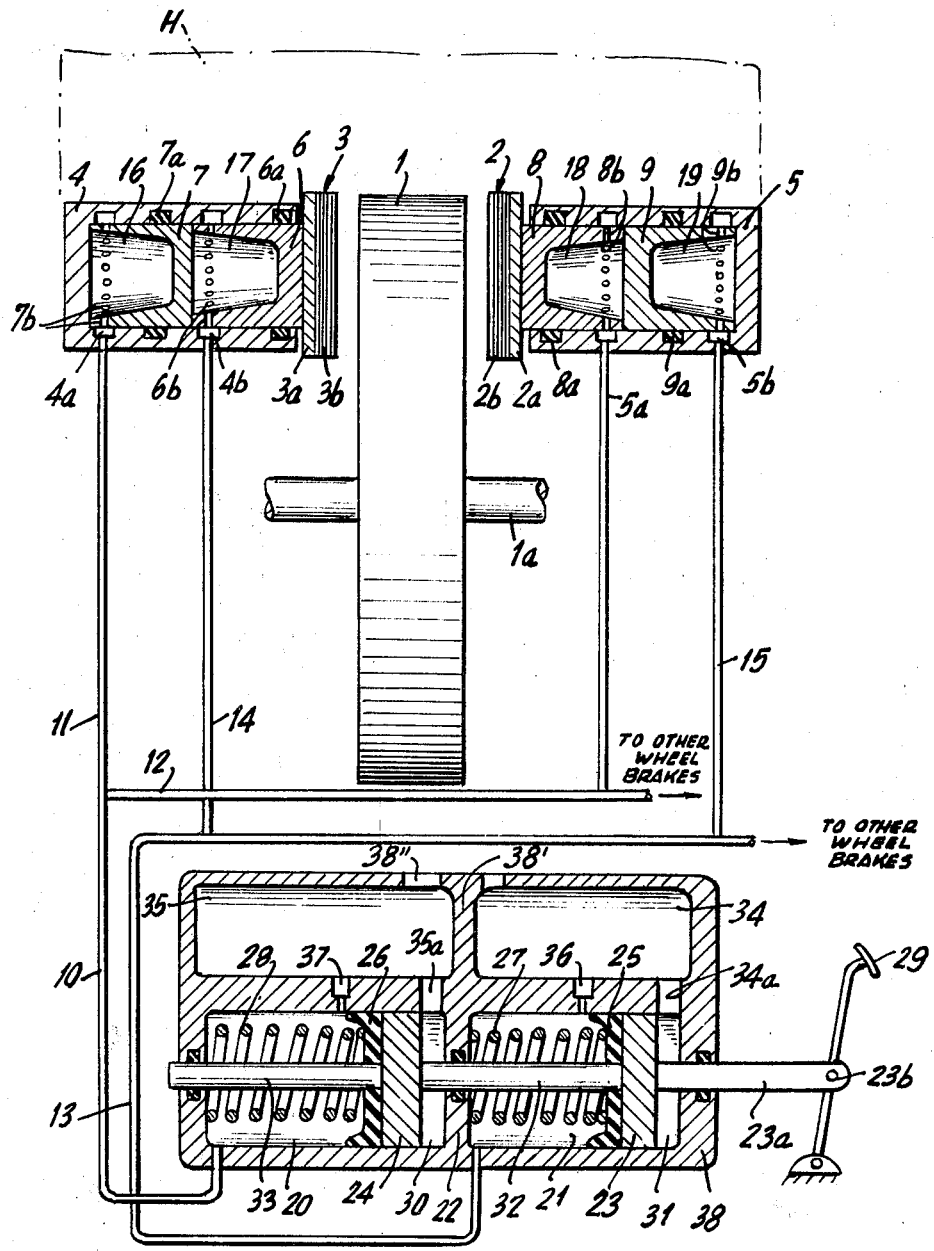

Our present invention relates to improvements in dual-network brake systems and, more particularly, to a wheel-brake arrangement for an automotive vehicle using dual-network fluid supply.

The use of so-called dual-network brake systems, because of increased safety, has gained in interest of late and, in fact, is required in many jurisdictions. The term "dual-network brake system" as used herein is intended to designate a vehicular brake system in which the master cylinder is subdivided into a pair of chambers, each of which may communicate with a respective compartment of a subdivided brake-fluid reservoir and receives a respective master-cylinder piston operated by the brake pedal of the vehicle. In so-called "tandem master cylinders," the master-cylinder chambers are disposed one behind the other, and the coaxially aligned but axially spaced pistons received in these chambers can be coupled by rods, springs or force-transmitting members. From each of the master cylinder chambers, a respective fluid-transmission network runs to the respective sets of wheel-brake cylinders. In general, earlier systems using dual-transmission networks have connected the master-cylinder chambers with respective sets of wheel-brake cylinders. Thus, if the vehicle was equipped with front-wheel brakes and rear-wheel brakes, one transmission network communicated with all of the wheel-brake cylinders of the front-wheel brakes, while the other communicated with the wheel-brake cylinders of the rear-wheel brakes. In another arrangement, a number of parallel wheel-brake cylinders were provided on each side of the brake surface for applying respective pads or brakeshoes against the single rotating surface at each wheel brake. The rotating surface was either the inner face of a drum (when drum-type internal-expansion brakes were involved), or a pair of braking faces a disk in planes generally transverse to its axis of rotation. In devices of the latter type, some prior-art constructions provided hydraulic-fluid networks which communicated with one of the wheel-brake cylinders of each wheel brake so that, in the event of failure in one fluid-transmission system, the other system would remain effective albeit to a lesser degree to brake all of the wheels. In general, disk-brake assemblies using wheel-brake cylinders mounted in opposite lobes of a support yoke extending around the periphery of the disk have proved to be of relatively complex manufacture since the numerous cylinder bores for the dual-network arrangements must be precision-formed independently of one another.

In the commonly assigned copending application Ser. No. 681,330, filed Nov. 8, 1967, there is described a diskbrake system whereby the disadvantages of these earlier arrangements are overcome by providing a brake housing reaching around the periphery of the brake disk connected with the wheel of the automotive vehicle and having at one side of this disk an actuating cylinder containing at least one and preferably two pistons subdividing this cylinder into a pair of independent working chambers effective to urge the brakeshoes flanking the disk in opposite directions against the latter. The chambers are supplied with brake fluid from respective fluid-transmission networks to which the brake fluid is delivered from dual-compartment master-cylinder assemblies. The master-cylinder assemblies can include the aforementioned tandem-type master cylinders in which the compartments are disposed one behind the other or so-called "twin" master cylinders in which the compartments are disposed side by side. In that system, however, the brake housing is shiftable relatively to the disk or is provided with a frame displaceable relatively to the disk and bearing directly against the brakeshoe remote from the actuating cylinder so that a reaction force generated by supplying fluid under pressure to the aforementioned chambers shifts the brake yoke indirectly to apply the remote brakeshoe to the disk, while the proximal brakeshoe is directly applied to the disk by its piston. One of the problems of earlier brakes solved by that system was the difficulty arising from the nonuniform application of the brakes upon failure of one of the networks, i.e. the loss of frictional surface, the increased stroke of the master-cylinder piston and the brake pedal, etc.

It is, therefore, the principal object of the present invention to extend the general principles laid down in the aforementioned copending application to other brake arrangements to make them capable of withstanding failure in one network while maintaining to the greatest extent possible the braking efficiency and characteristics of the remaining system.

A further object of this invention is to provide a dual-network brake arrangement of simplified construction, high effectiveness and low cost.

We have now found that it is possible to overcome the disadvantages of prior-art brake systems and obtain dual-network control of a brake without the complexities and expense involved in boring numerous cylinders in each lobe of a disk brake by providing a disk brake which comprises a yoke or housing reaching around the periphery of a brake disk and having a pair of lobes flanking the opposite braking faces of this disk, the lobes each being formed with a cylinder bore receiving a pair of pistons in force-transmitting relationship with one another and displaceable under fluid pressure supplied to the respective bores by individual networks delivering the fluid to the bores in both lobes behind the respective piston with reference to the brake disk. Thus, in each yoke lobe, there is provided a pair of pistons disposed one behind the other and pressurizable from individual networks so that fluid introduced between the piston proximal to its brakeshoe and the piston of the same bore distal therefrom will urge the latter piston against the housing while the former piston is brought to bear upon the brakeshoe.

During normal brake operation or failure of the fluid supply to the front piston, the fluid delivered behind the relatively remote or distal piston serves to force the latter away from the wall of the bore and acts against the brakeshoe to bring the latter to bear on the disk, via a force-transmitting member here constituted by the inoperative proximal piston previously discussed. The master cylinder means comprises a tandem master cylinder having a pair of jointly shiftable coaxial pistons; the pistons are axially spaced in this bore, i.e. are disposed one behind the other, and the cylinders have outlets ahead of the pistons with respect to the actuating end thereof connected with the brake pedal, the outlets being in communication with the respective fluid-transmission networks. Advantageously, a partition is disposed between the two compartments of the cylinder bore to separate them from one another while the master-cylinder pistons are connected by a rod extending through this partition and rigidly joining the pistons together. It has also been found desirable to arrange the transmission networks so that one of the compartments feeds the distal wheel-brake compartment of one lobe and the proximal compartment of the other.

According to another feature of this invention, the pistons are interconnected by a piston rod in the respective lobe, while partitions are provided within the cylinder bores of the lobes between the wheel-brake pistons, the connecting rod passing slidably through these partitions.

The aforedescribed system has the principal advantage that, in the event of failure of one of the fluid-transmission networks because of leakage or loss of seal, the remaining transmission network and operative master-cylinder chamber will suffice to apply both brakeshoes of each wheel brake against the disk and, moreover, not materially increase either the force required to displace the pedal or the stroke thereof. Since the stroke of the pedal is not increased, it is advantageous to provide a pressure-responsive switch in the transmission lines for operating a warning signal on the dashboard of the vehicle and thereby indicating to the driver that a failure has occurred.

Figure 2:
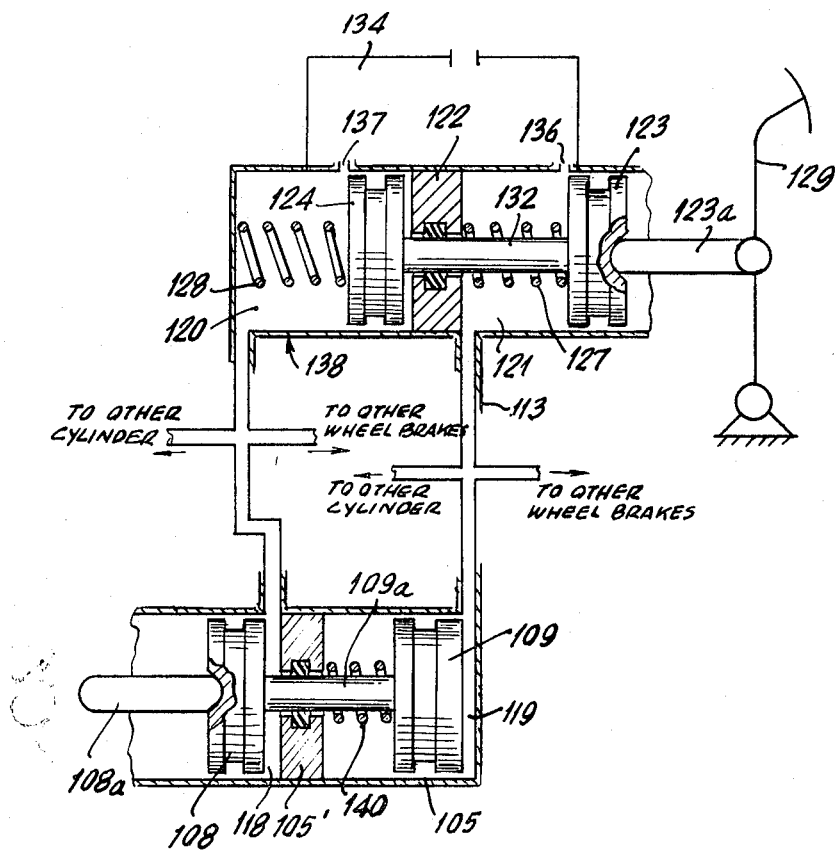

The above and other objects, features and advantages of the present invention will become more readily apparent from the following description, reference being made to the accompanying drawing in which:

FIG. 1 is a diagrammatic view of a wheel-brake cylinder system showing a single wheel brake and the master cylinder associated therewith, all in diagrammatic form and partly in axial cross-section; and FIG. 2 is a view similar to FIG. 1 illustrating a modification of this invention.

In FIG. 1 of the drawing, we show a brake disk 1 whose shaft 1a is connected to a wheel disk or axle of an automotive vehicle and is frictionally engageable by a pair of brakeshoes 2 and 3 flanking the opposite braking faces of the disk and axially shiftable in a housing represented in dot-dash lines at H. The housing H is fixed with respect to the axis of rotation of the brake disk 1. As indicated in this figure, the housing H also is provided with a pair of cylinders 4, 5 containing two pistons 6, 8 proximal to the disk 1 adjoining the respective brakeshoes 3, 2, and, in tandem therewith, two relatively distal pistons 7, 9. The pistons 8 and 6 bear respectively upon the backing plates 2a and 3a of the brakeshoes 2 and 3 whose brake linings 2b and 3b are of wear-resistant material of a high coefficient of friction. The pistons 6, 7 and 8, 9 are coaxial with one another and disposed one behind the other in respective cylinders 4 and 5 whose cylinder bores are continuous, i.e. not interrupted by any partition intermediate these pistons. All of the pistons have the same diameter. Piston 7 has a rearwardly open cavity defining a working chamber 16 with the end wall of the bore 4 and is formed of cup-like configuration open away from the disk 1; the piston 7 is provided at its end remote therefrom with an array of angularly equispaced lateral passages in the form of radial bores 7b communicating with an inwardly open circumferential recess 4a in the inner wall of this bore. The seal between the bore and the piston is constituted by a ring 7a which is recessed in the wall of the bore and slidably engages the piston 7 at a location remote from the opening into its working chamber. A second working chamber 17 is formed between the pistons 6 and 7 and can be supplied with brake fluid via radial, angularly equispaced bores 6b which are located remote from the disk 1 at an annular recess 4b in the wall of cylinder 4. A seal 6a recessed in the wall of the bore slidably engages piston 6 at a location remote from the opening into its chamber 17. Analogously, the pistons 8 and 9 are provided with seals 8a and 9a, arrays of radial equispaced bores 8b and 9b, circumferential recesses 5a and 5b and corresponding working chambers 18 and 19.

The master cylinder means of this system comprises a housing 38 defining a pair of reservoir compartments 34 and 35, separated by a partition 38', which may be filled with the brake fluid upon removal of a plug from openings 38". In the corresponding cylinder compartments 21 and 20, which are coaxially aligned as indicated earlier and separated by a partition 22, respective pistons 23 and 24 are axially shiftable and are coupled together via a rod 32. Each of the pistons 23, 24 carries a primary cup 25 or 26 which has a peripheral flange slidably bearing on the inner wall of the respective compartment 21, 20. Piston 23 is rigid with a further rod 23a connected with a brake pedal 29 by any conventional linkage, e.g. a pivot 23b. A coil spring 27 bears against the partition 22 and yieldably resists displacement of the piston 23, 25 while fluid is fed from the reservoir chamber 24 to the compartment 31 behind this piston via an intake bore 34a. A bypass port 36 opens into compartment 21 just ahead of the piston 23, 25. Similarly, the chamber 30 behind the piston 24, 26 is supplied with brake fluid from an intake port 35a while a bypass port 37 is located just beyond the piston 24, 26 in its rest position as illustrated. A coil spring 28 coaxially surounds the rod extension 33 which is slidably received in the far wall of the housing 38 and serves as a guide member and to ensure equal effective surface areas for both pistons without stepping the clyinder bore. The connecting rod 32 slidably passes through the partition 22 which is provided with a seal to prevent leakage of fluid between the compartments.

A first transmission network, including a line 10 which is branched at 11, 12, is supplied with brake fluid from the compartment 20 and delivers the brake fluid to the annular recesses 4a and 5a of the distal piston 7 and the proximal piston 8 on opposite sides of the disk 1. Complementarily, another fluid-transmission network is formed with a line 13 which is supplied with fluid from compartment 21 and feeds it to branches 14 and 15 communicating respectively with annular recesses 4b and 5b of the proximal piston 6 and the distal piston 9.

Upon actuation of the brake pedal 29, rod 32 is shifted to the left together with pistons 23, 25 and 24, 26 whose cups thus close the bypass ports 36 and 37, thereby shutting off the chambers and preventing escape of the brake fluid except to the lines 10 and 13. As the pistons 23, 25 and 24, 26 are displaced to the left, fluid is forced through the lines 10 through 15 to the compartments 16 through 19 of the wheel-brake cylinders. Since pistons 23 and 24 of the master cylinder and pistons 6-9 of the wheel cylinders all have the same diameters and cross-sections, each of the chambers 16 through 19 sustains the same pressure. The pistons 6 and 9 may thus be held in place in equilibrium against the rear walls or bottoms in the respective bores.

In the event of failure of the network 10 through 12, brake fluid is supplied via the remaining network 13 through 15 to the chambers 17 and 19. The pressure in chamber 17 drives piston 7 to the left, thereby sealing it against the bottom part of its cylinder, while piston 6 is displaced to the right to bring its brakeshoe 3 into contact with the disk 1. Simultaneously, the fluid supplied to chamber 19 displaces piston 9 to the left, thereby entraining piston 8 in this direction and applying the brakeshoe 2 to the corresponding face of the disk. Since normal operation maintains the relatively distal-brake pistons 7 and 9 in their left- and right-hand positions, respectively, the fluid requirements may be increased somewhat when only a single network is employed. In this case, a warning of failure in one of the networks is provided for the operator of the vehicle. It will be understood that the housing H, while preferably a fixed yoke for the purposes of the present invention, can also be a so-called "floating" yoke which is shiftable transversely to the braking faces of this disk. For the same foot pressure, the same braking force will then be attainable. Additionally, the master-cylinder arrangement may be provided with a so-called "crossover" valve ensuring hydraulic equalization in the wheel-brake cylinders. It will be understood that the master cylinder illustrated in FIG. 1 can be replaced by a "twin" master cylinder in which the cylinder compartments lie side by side and the parallel pistons are interconnected by a traverse bar operated by the brake pedal 29.

In FIG. 2, we show a modification of this invention wherein the brake pedal 129 bears via a link 123a against a piston 123 axially shiftable in the bore 121 of a master cylinder 138 against the force of a spring 127 interposed between the piston 123 and the partition 122 separating chamber 121 from the other compartment 120. The reservoir is here represented at 134 and communicates with the bores 121 and 120 via ports 136 and 137. In chamber 120, a coil spring 128 resists displacement of the piston 124. A rigid rod 132 interconnects the pistons 123, 124 for joint displacement. From compartment 121, a duct 113 supplies brake fluid to a wheel-brake cylinder 105 which is subdivided by a partition 105' to form the working compartments 119 and 118, respectively. A force-transmitting link 108a applies pressure to the brakeshoes of the piston 108 which is axially shiftable in chamber 118 and is rigidly connected with the piston 109 by a further rod 109a passing slidably through the partition 105'. A similar wheel-brake means is provided at the opposite side of the disk and corresponds in all respects to the cylinder 105 described above but is connected therewith with the compartments in cross-relationship as described with respect to FIG. 1. Here, too, a twin master cylinder may be substituted. A return spring 140 yieldably retains the piston 109 against hydraulic displacement. In this case, failure of one of the brake networks permits the remaining network to function with its piston as if there had been no failure. Of course, the volume requirements of the wheel-brake cylinder remain the same whether or not a failure has ocurred (even though greater foot pressure may be required).

We claim:
1. A vehicle-brake system comprising:
a rotatable brake disk;
housing means forming a pair of brake cylinders on opposite sides of said disk;
a pair of pistons of like diameter disposed in tandem in each of said brake cylinders, the pistons of each pair including a proximal piston relatively close to said disk and a distal piston relatively remote from said disk, said distal pistons being movable independently of said proximal pistons;
a pair of brakeshoes respectively carried on said proximal pistons adjacent said disk;
a pair of first conduits respectively terminating at said brake cylinders to the rear of the proximal pistons theroef but forwardly of the distal pistons thereof as seen from said disk;
a pair of second conduits respectively terminating at said brake cylinders to the rear of the distal pistons thereof as seen from said disk;
a first source of pressure fluid connected to the first conduit of one brake cylinder and to the second conduit of the other brake cylinder for concurrently displacing the proximal piston of said one brake cylinder and the distal piston of said other brake cylinder toward said disk;
a second source of pressure fluid connected to the second conduit of said one brake cylinder and to the first conduit of said other brake cylinder for concurrently displacing the remaining pistons toward said disk; and
operating means for concurrently actuating said sources to exert substantially equal fluid pressure upon all said pistons, each of said pistons being provided with a rearwardly open cavity surrounded by a peripheral wall having a lateral passage for establishing communication between said cavity and the corresponding conduit.

2. The system defined in claim 1 wherein said first and second sources of pressure fluid comprise a pair of parallel master-cylinder chambers, a pair of parallel master-cylinder pistons respectively received in said chambers, and means for jointly displacing said master-cylinder pistons.

3. The system defined in claim 1 wherein said first and second sources of pressure fluid comprise a pair of co-axial master-cylinder tandem chambers separated by a partition and a pair of master-cylinder pistons axially shiftable in said chambers.

4. The system defined in claim 3, further comprising a rod extending slidably through said partition and rigidly interconnecting said master-cylinder pistons.

References Cited
UNITED STATES PATENTS

| | | | |
|---|---|---|---|
| 2,497,438 | 2/1950 | Butler | 188—152 |
| 2,918,148 | 12/1959 | Uhlenhaut et al. | 188—152 |
| 3,156,325 | 11/1964 | Taylor | 188—73 |
| 3,337,009 | 8/1967 | Meier | 188—106 X |

FOREIGN PATENTS

| | | |
|---|---|---|
| 951,906 | 3/1964 | Great Britain. |

GEORGE E. A. HALVOSA, Primary Examiner

U.S. Cl. X.R.
60—54.5; 188—106